United States Patent [19]
Espe et al.

[11] Patent Number: 5,979,389
[45] Date of Patent: Nov. 9, 1999

[54] AIR-INTAKE DEVICE HAVING VARIABLE INDUCTION-PIPE LENGTH FOR AN INTERNAL COMBUSTION ENGINE

[75] Inventors: Carsten Espe, Thalmassing; Peter Fischer, Regensburg; Michael Lutz, Hagelstadt; Stefan Schmid, Freising, all of Germany

[73] Assignee: Siemens Aktiengesellschaft, Munich, Germany

[21] Appl. No.: 09/103,164

[22] Filed: Jun. 22, 1998

Related U.S. Application Data

[63] Continuation of application No. PCT/DE96/02385, Dec. 10, 1996.

[30]    Foreign Application Priority Data

Dec. 21, 1995 [DE] Germany .......................... 195 48 055

[51] Int. Cl.⁶ ................................................. F02M 35/10
[52] U.S. Cl. ...................................................... 123/184.55
[58] Field of Search ........................ 123/184.53, 184.55, 123/184.21

[56]           References Cited

U.S. PATENT DOCUMENTS

| | | | |
|---|---|---|---|
| 4,617,897 | 10/1986 | Sasaki et al. ............................ | 123/432 |
| 4,643,138 | 2/1987 | Ruf et al. .............................. | 123/52 M |
| 4,646,689 | 3/1987 | Katsumoto et al. ............... | 123/52 MB |
| 4,726,329 | 2/1988 | Atkin ................................ | 123/52 MB |
| 4,765,286 | 8/1988 | Lyjak et al. ......................... | 123/52 MB |
| 4,854,270 | 8/1989 | Melde-Tuczai et al. ............ | 123/52 M |
| 5,033,417 | 7/1991 | van Basshuysen et al. ....... | 123/52 MB |
| 5,048,469 | 9/1991 | Spray ................................. | 123/52 MB |
| 5,211,139 | 5/1993 | Houle et al. ....................... | 123/52 MB |

FOREIGN PATENT DOCUMENTS

| | | |
|---|---|---|
| 0177794A1 | 10/1984 | European Pat. Off. . |
| 0201180A1 | 11/1986 | European Pat. Off. . |
| 3820643A1 | 12/1989 | Germany . |
| 360147531 | 8/1985 | Japan ................................ 123/184.55 |

*Primary Examiner*—Noah P. Kamen
*Assistant Examiner*—Brian Hairston
*Attorney, Agent, or Firm*—Herbert L. Lerner; Laurence A. Greenberg

[57]            ABSTRACT

An air-intake device having a variable induction-pipe length for an internal combustion engine includes a cylindrical collector. Induction pipes extend from inlets on the collector along a periphery of the collector up to inlet ducts of an internal combustion engine. A switching device in the shape of a cylinder sector is pivotably mounted in the collector. In a first rotary position, the switching device closes lead-in ports which connect the induction pipes to the collector. Therefore, the switching device has elevations on its lateral surface. The elevations have a front surface and adjoining side walls together forming a first contact surface in a closing direction, and an end region opposite the front surface forming a second contact surface. The first and second contact surfaces have a seal and bear against first and second bearing surfaces of the lead-in ports in the first rotary position, for tightly closing the lead-in ports.

6 Claims, 3 Drawing Sheets

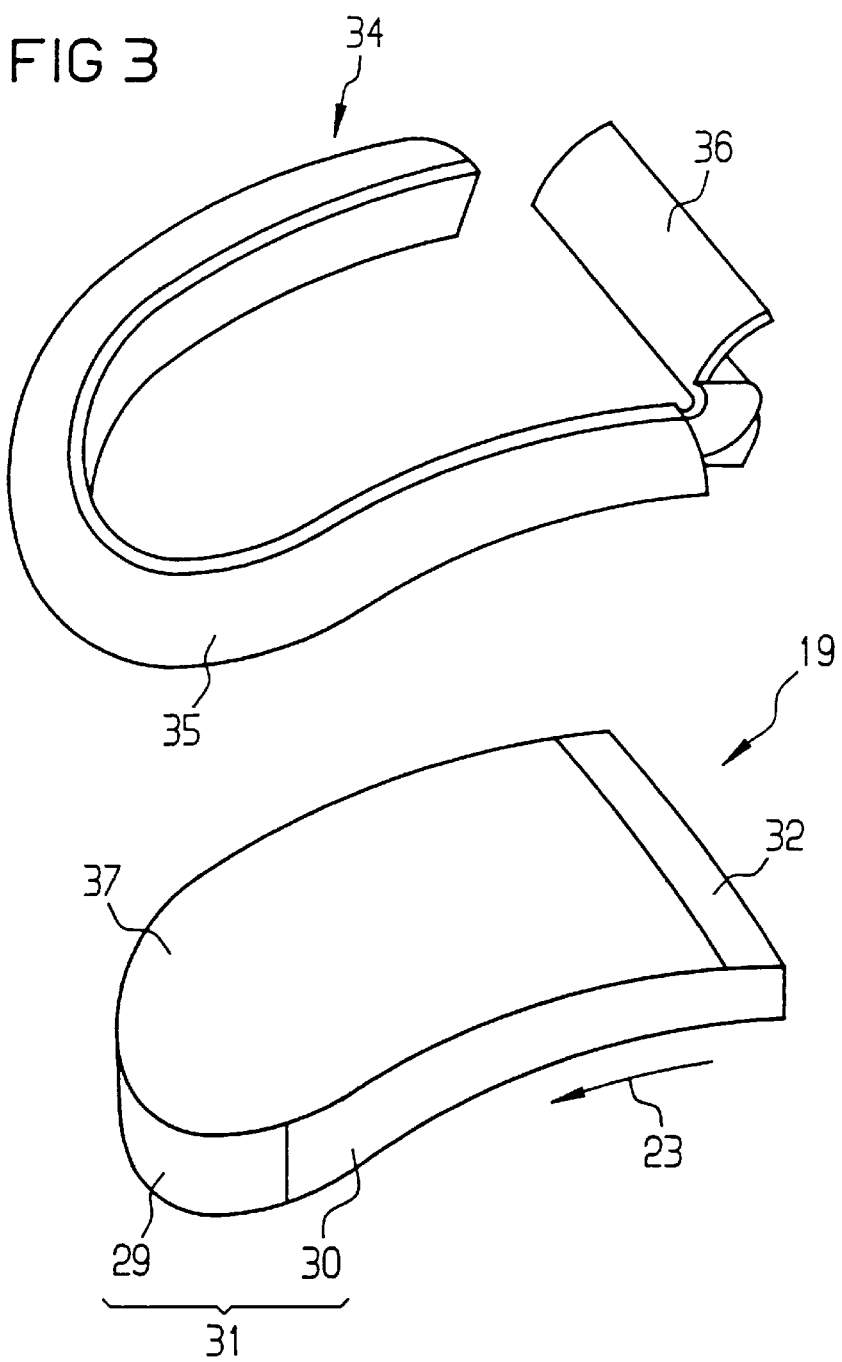

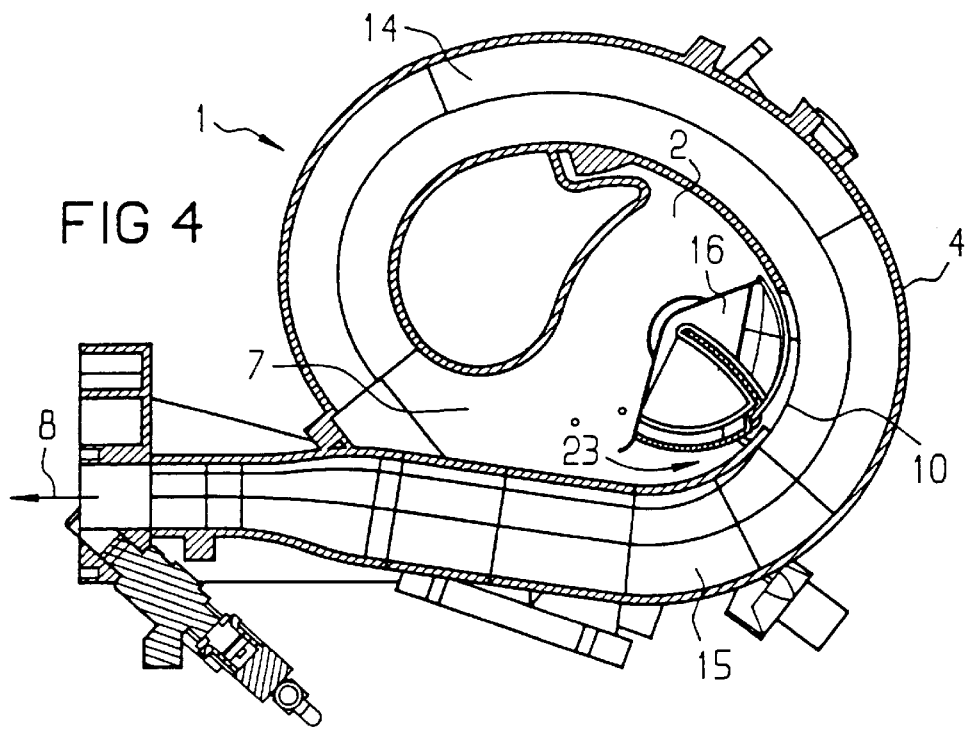
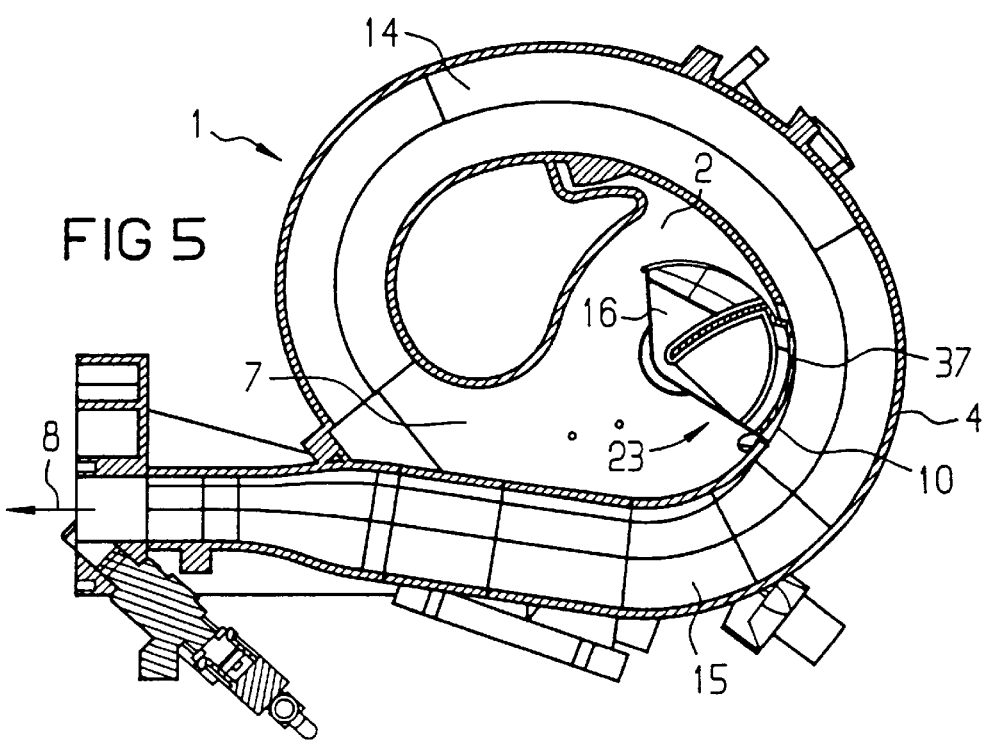

5,979,389

AIR-INTAKE DEVICE HAVING VARIABLE INDUCTION-PIPE LENGTH FOR AN INTERNAL COMBUSTION ENGINE

CROSS-REFERENCE TO RELATED APPLICATION

This application is a continuation of International Application No. PCT/DE96/02385, filed Dec. 10, 1996, which designated the United States.

BACKGROUND OF THE INVENTION

Field of the Invention

The invention relates to an air-intake device having a variable induction-pipe length for an internal combustion engine, including a cylindrical collector, induction pipes disposed on a periphery of the collector, lead-in ports to the induction pipes, and a switching device in the shape of a cylinder sector, the switching device pivotably mounted for closing the lead-in ports in a first rotary position and opening the lead-in ports in a second rotary position.

Accordingly, the invention is directed toward variable induction pipes of an internal combustion engine, i.e. induction pipes adjustable between two lengths, wherein the length of the induction pipes is adapted in each case to the operating state of the internal combustion engine. The respective maximum engine output can thereby be increased at both low and high rotational speeds.

International Publication No. WO 96/02743, corresponding to U.S. Pat. No. 5,709,182, describes an air-intake device which has a collector with a cylindrical construction and induction pipes disposed on the periphery thereof. The induction pipes are connected to the collector at one end through inlets. However, they may also communicate directly with the collector through lead-in ports, with the effective length of the induction pipes then being reduced. The effective length of the induction pipes denotes the length of an induction-pipe region in which most of the air mass flow occurs.

A switching device which has a cylindrical construction is pivotably mounted in the collector. It closes the lead-in ports in a first rotary position. To that end, it bears on an encircling extension of the lead-in ports in a two-dimensional manner. In the first rotary position, the effective induction-pipe length then only corresponds to the length of the induction pipe from the entry up to the cylinder of the internal combustion engine, if the lead-in port is tightly closed. Considerable outlay is therefore necessary in order to keep the tolerances in the switching device and in the collector so low that bearing of the switching device in a sealing manner against the encircling extension is ensured.

SUMMARY OF THE INVENTION

It is accordingly an object of the invention to provide an air-intake device having a variable induction-pipe length for an internal combustion engine, which overcomes the hereinafore-mentioned disadvantages of the heretofore-known devices of this general type in such a way that lead-in ports can be tightly closed in a simple manner.

With the foregoing and other objects in view there is provided, in accordance with the invention, an air-intake device having a variable induction-pipe length for an internal combustion engine, comprising a cylindrical collector having a periphery; induction pipes disposed on the periphery of the collector; lead-in ports leading to the induction pipes, the lead-in ports each having first and second bearing surfaces; a switching device having a cylinder sector shape and a lateral surface, the switching device pivotably mounted for closing the lead-in ports in a first rotary position and opening the lead-in ports in a second rotary position; elevations disposed on the lateral surface of the switching device, the elevations having a front surface and adjoining side walls together forming a first contact surface in a closing direction, the elevations having an end region forming a second contact surface opposite the front surface, and a seal disposed on the first and second contact surfaces, the first and second contact surfaces form-lockingly bearing against the respective first and second bearing surfaces in the first rotary position.

In accordance with another feature of the invention, the seal has a sealing lip in the vicinity of the first contact surface.

In accordance with a further feature of the invention, the seal has a bracket in the vicinity of the second contact surface.

In accordance with an added feature of the invention, the elevations narrow in the closing direction.

In accordance with an additional feature of the invention, the elevations have a parabolic outline in the closing direction.

In accordance with a concomitant feature of the invention, the first contact surface is a draft of a mold.

Other features which are considered as characteristic for the invention are set forth in the appended claims.

Although the invention is illustrated and described herein as embodied in an air-intake device having a variable induction-pipe length for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an exploded perspective view of a elevation of the switching device according to FIG. 2; and FIGS. 4 and 5 are radial-sectional views of the air-intake device according to FIG. 1 with two different positions of the switching device.

DESCRIPTION OF THE PREFERRED EMBODIMENTS

Figure 1:
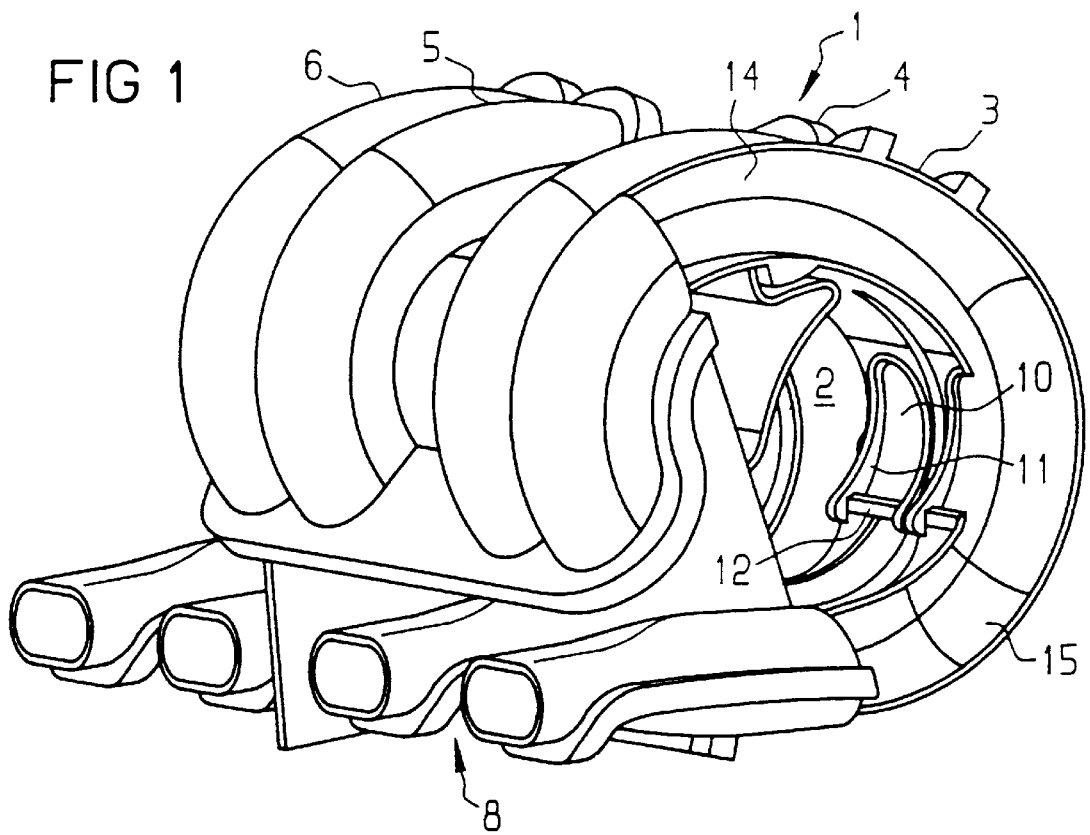
FIG. 1 is a diagrammatic, perspective view of an air-intake device according to the invention.

Referring now to the figures of the drawings in detail and first, particularly, to FIG. 1 thereof, there is seen an air-intake device 1 that has a cylindrical collector 2 which is connected to the outside air through a non-illustrated throttle-valve intake duct. Four induction or intake pipes 3, 4, 5, 6 each extend from an inlet 7 shown in FIGS. 4 and 5, along a periphery of the collector 2 up to an inlet duct 8, which leads into an associated cylinder of a non-illustrated internal combustion engine.

The collector 2 is provided with lead-in ports leading to the induction pipes 3, 4, 5, 6. A lead-in port 10 leading to the induction pipe 4 is described below by way of example. The lead-in port 10 is bordered by a first bearing surface 11 and a second bearing surface 12 which has a web-shaped structure. A first section 14 of the induction pipe 4 extends from the inlet 7 up to the lead-in port 10. A second section 15 of the induction pipe 4 extends from the lead-in port 10 up to the inlet duct 8. When the lead-in port 10 is closed, the air flows through the first and second sections 14, 15 of the induction pipe 4 to the associated cylinder. The effective length of the induction pipe 4 then corresponds to the length of the induction pipe 4.

At low and medium rotational speeds of the internal combustion engine, improved charging of the cylinders with air and thus an increase in the torque can be achieved at full load by a long effective length of the induction pipes 3, 4, 5, 6. At high rotational speeds and full load, the charging of the cylinders with air can be increased by a short effective length of the induction pipes 3, 4, 5, 6. If the lead-in port 10 is not closed, most of the air flows from the collector 2 directly through the lead-in port 10 and through the second section 15 of the induction pipe 4 to the associated cylinder. The effective length of the induction pipes 3, 4, 5, 6 then corresponds only to the length of the respective second section 15 of the induction pipes 3, 4, 5, 6, which is thus favorable for higher rotational speeds.

Figure 2:
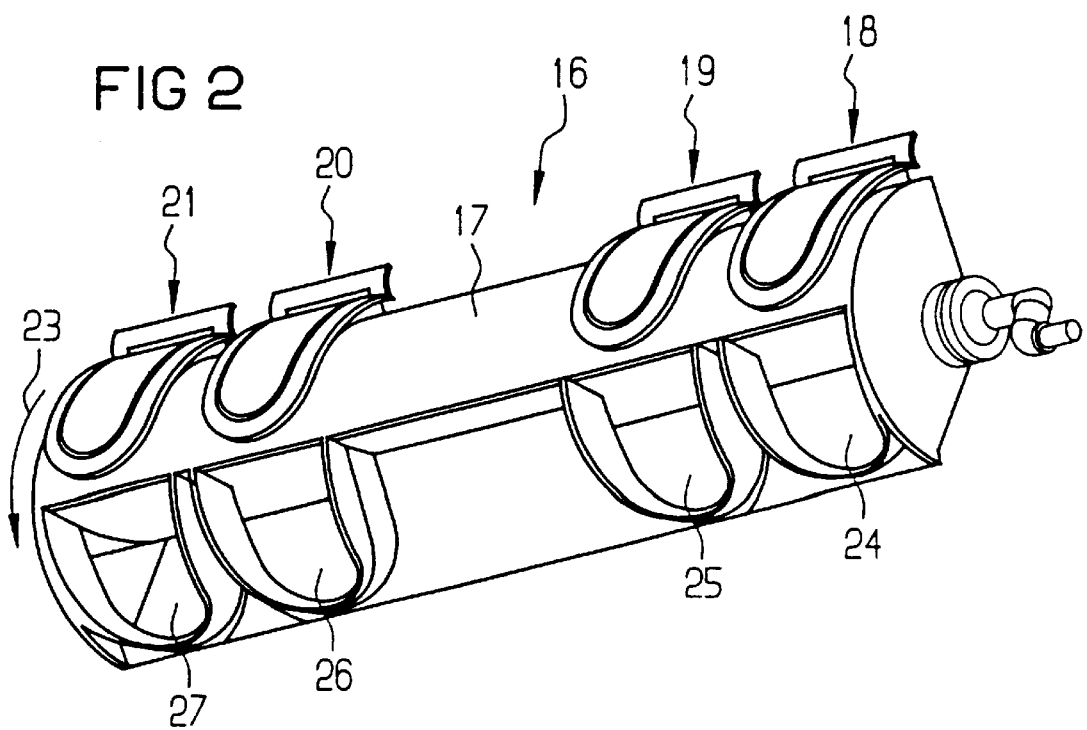
FIG. 2 is a perspective view of a switching device of the air-intake device according to FIG. 1.

A switching device 16 shown in FIG. 2, which is constructed in the shape of a cylinder sector, is pivotably mounted in the collector 2. The switching device 16 closes the lead-in ports 10 in a first rotary position and clears them in a second rotary position. The switching device 16 has elevations or projections 18, 19, 20, 21 on a lateral or jacket surface 17, which are disposed at a distance from one another in accordance with the distance between the lead-in ports 10. As seen in a closing direction (designated by an arrow 23), the switching device 16 has air-guide openings 24, 25, 26, 27 through which the air flows from the collector 2 directly to the second section 15 of the induction pipes 3, 4, 5, 6, in the second rotary position.

A non-illustrated engine control system of a motor vehicle controls a drive as a function of the rotational speed of the internal combustion engine and the position of the throttle valve. The drive is constructed, for example, as a pneumatic pressure capsule in such a way that the switching device 16 is pivoted into the first or the second rotary position, depending on the rotational speed.

The elevation 19 is described below by way of example. It can be seen from FIG. 2 that the elevations 18, 20, 21 are of identical construction. An exploded representation in FIG. 3 shows the elevation 19 having an outline which narrows in the form of a parabola in the closing direction 23. The elevation 19 has a front or end surface 29 in the closing direction 23 and adjoining side walls 30 which form a first contact surface 31. An end region of the elevation 19 which is located opposite the front surface 29 forms a second contact surface 32. A seal 34 is attached, e.g. adhesively bonded, to the first and second contact surfaces 31, 32. The seal 34 has a sealing lip 35 along the first contact surface 31, which compensates for an axial misalignment of the elevation 19, that may arise due to production inaccuracies. The seal 34 has a cockscomb-shaped bracket 36 along the second contact surface 32. In the first rotary position, the bracket 36 comes to bear in a two-dimensional and sealing manner against the second bearing surface 12.

FIG. 4 shows the switching device 16 in its second rotary position. The air flows directly from the collector 2 through the air-guide opening 25 and the lead-in port 10 into the second section 15 of the induction pipe 4. The elevation or fin 19 is disposed in the collector 2 in such a way that it does not disturb the flow.

FIG. 5 shows the switching device 16 in its first rotary position. The seal 34 on the contact surfaces 31, 32 of the elevation or prominence 19 bears against the bearing surfaces 11, 12 of the lead-in port 10 in a sealing and form-locking manner. A form-locking connection is one which connects two elements together due to the shape of the elements themselves, as opposed to a force-locking connection, which locks the elements together by force external to the elements. The elevation 19 is preferably constructed in such a way that in the first rotary position, its front surface 29 bears against the first bearing surface 11 in such a way that a curved plateau surface 37 of the elevation 19 in the region of the front surface 29 is flush with an inner wall surface of the induction pipe. Consequently, the laminar flow in the induction pipe 4 is not disturbed.

Due to the parabolic construction of the elevation 19, the seal 34 advantageously only comes to bear against the first bearing surface 11 in the first rotary position. Thus the seal 34 is not subjected to any heavy shear loads when the switching device 16 is pivoted from the first rotary position into the second rotary position and vice versa. For reducing the shear load on he seal 34 and thus increasing its durability, the first contact surface 31 is constructed such that the base surface of the elevation 19 is greater than the plateau surface 37 of the elevation 19. In this manner, the side walls 30 slope downward from the plateau surface 37 to the base surface and therefore form a sloping first contact surface 31.

The elevation 19 may equally be constructed in a rectangular or triangular shape, if the lead-in port 10 has a corresponding contour.

Due to the described construction of the elevations 18, 19, 20, 21 of the switching device and the lead-in ports 10, production-related tolerances, which are unavoidable in particular in switching devices that are made of plastic, have no effect on the effectiveness of the tight closing of the lead-in ports 10 in the first rotary position of the switching device 16.

We claim:

1. An air-intake device having a variable induction-pipe length for an internal combustion engine, comprising:

a cylindrical collector having a periphery;

induction pipes disposed on said periphery of said collector;

lead-in ports leading to said induction pipes, said lead-in ports each having first and second bearing surfaces;

a switching device having a cylinder sector shape and a lateral surface, said switching device pivotably mounted for closing said lead-in ports in a first rotary position and opening said lead-in ports in a second rotary position; and elevations disposed on said lateral surface of said switching device, said elevations having a front surface and adjoining side walls together forming a first contact surface in a closing direction, said elevations having an end region forming a second contact surface opposite said front surface, and a seal disposed on said first and second contact surfaces, said first and second contact surfaces form-lockingly bearing against said respective first and second bearing surfaces in said first rotary position.

2. The air-intake device according to claim 1, wherein said seal has a sealing lip in the vicinity of said first contact surface.

3. The air-intake device according to claim 1, wherein said seal has a bracket in the vicinity of said second contact surface.

4. The air-intake device according to claim 1, wherein said elevations narrow in said closing direction.

5. The air-intake device according to claim 4, wherein said elevations have a parabolic outline in said closing direction.

6. The air-intake device according to claim 1, wherein said elevations each have a top surface and a bottom surface, said bottom surface being greater than said top surface in a region of said first contact surface resulting in downward sloping said side walls of said first contact surface.

* * * * *